US011063975B2

(12) United States Patent
Miller et al.

(10) Patent No.: US 11,063,975 B2
(45) Date of Patent: *Jul. 13, 2021

(54) MALICIOUS CONTENT DETECTION WITH RETROSPECTIVE REPORTING

(71) Applicant: Cisco Technology, Inc., San Jose, CA (US)

(72) Inventors: Jason V. Miller, Carseland (CA); Adam J. O'Donnell, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,583

(22) Filed: Jan. 9, 2020

(65) Prior Publication Data

US 2020/0153848 A1 May 14, 2020

Related U.S. Application Data

(63) Continuation of application No. 15/659,953, filed on Jul. 26, 2017, now Pat. No. 10,554,678.

(51) Int. Cl.
*H04L 29/06* (2006.01)
*G06F 21/56* (2013.01)

(52) U.S. Cl.
CPC ......... *H04L 63/1425* (2013.01); *G06F 21/56* (2013.01); *H04L 29/06877* (2013.01); *H04L 63/14* (2013.01)

(58) Field of Classification Search
CPC . H04L 63/14; H04L 63/1416; H04L 63/1408; H04L 63/1433; H04L 63/1425; H04L 63/1441; H04L 63/1491; H04L 63/08; H04L 29/06877–06938; G06F 21/56; G06F 21/561; G06F 21/565; G06F 21/562; G06F 21/564; G06F 21/566; G06F 21/50

See application file for complete search history.

(56) References Cited

U.S. PATENT DOCUMENTS 7,805,604 B2   9/2010   Khosmood et al.
7,836,506 B2   11/2010  Liu
(Continued)

OTHER PUBLICATIONS

Cisco, "Cisco Advanced Malware Protection for Endpoints," Data Sheet, Mar. 2017, 10 pages.
(Continued)

*Primary Examiner* — Kristine L Kincaid
*Assistant Examiner* — Shaqueal D Wade
(74) *Attorney, Agent, or Firm* — Edell, Shapiro & Finnan, LLC

(57) ABSTRACT

A server obtains security intelligence data used for classifying whether data associated with user activity in a network is undesirable, and classifies the data based on the security intelligence data. The server provides an initial classifying result of the data to a device associated with the data. At a subsequent time, the server obtains updated security intelligence data and re-classifies whether the first data is undesirable based on the updated security intelligence data. Responsive to a determination that the initial classifying result is changed based on the re-classifying, the server provides an updated classifying result to the device associated with the data.

20 Claims, 5 Drawing Sheets

(56) References Cited

U.S. PATENT DOCUMENTS

| | | |
|---|---|---|
| 7,937,758 B2 | 5/2011 | Kronenberg et al. |
| 8,510,841 B2 | 8/2013 | Richard et al. |
| 8,621,233 B1 | 12/2013 | Manadhata et al. |
| 8,621,610 B2 | 12/2013 | Oberheide et al. |
| 8,978,137 B2 | 3/2015 | Friedrichs et al. |
| 9,141,792 B2 | 9/2015 | Baluda et al. |
| 9,245,120 B2 | 1/2016 | Friedrichs et al. |
| 9,639,697 B2 * | 5/2017 | Friedrichs ............. G06F 21/567 |
| 9,912,681 B1 * | 3/2018 | Ismael .................... G06F 21/55 |
| 2005/0105524 A1 | 5/2005 | Stevens et al. |
| 2007/0180116 A1 | 8/2007 | Kim et al. |
| 2007/0189531 A1 | 8/2007 | Lecomte et al. |
| 2008/0244748 A1 | 10/2008 | Neystadt et al. |
| 2008/0320499 A1 | 12/2008 | Suit |
| 2009/0044024 A1 | 2/2009 | Oberheide et al. |
| 2009/0064323 A1 * | 3/2009 | Lin ....................... H04L 63/126 726/22 |
| 2009/0172824 A1 | 7/2009 | Colburn |
| 2009/0271857 A1 | 10/2009 | Wang et al. |
| 2010/0050244 A1 | 2/2010 | Tarkhanyan et al. |
| 2010/0100963 A1 | 4/2010 | Mahaffey et al. |
| 2010/0162400 A1 | 6/2010 | Feeney et al. |
| 2010/0192222 A1 | 7/2010 | Stokes et al. |
| 2011/0178831 A1 | 7/2011 | Ravichandran |
| 2011/0179484 A1 | 7/2011 | Tuvell et al. |
| 2011/0214187 A1 | 9/2011 | Wittenstein et al. |
| 2013/0014264 A1 * | 1/2013 | Kennedy ................. H04L 41/22 726/25 |
| 2013/0067577 A1 | 3/2013 | Turbin et al. |
| 2013/0074185 A1 | 3/2013 | McDougal et al. |
| 2013/0283382 A1 | 10/2013 | Kim et al. |
| 2015/0205959 A1 | 7/2015 | Friedrichs et al. |
| 2018/0091453 A1 * | 3/2018 | Jakobsson ............... H04L 51/12 |
| 2019/0036949 A1 | 1/2019 | Miller et al. |

OTHER PUBLICATIONS

Cova, et al., "Detection and Analysis of Drive-by-Download Attacks and Malicious JavaScript Code," Proceedings of the 19th International Conference on World Wide Web, WWW 2010, Apr. 2010, 10 pages.

Schultz, et al., "Data Mining Methods for Detection of New Malicious Executables," 2001 IEEE Symposium on Security and Privacy, May 2011, 12 pages.

* cited by examiner

MALICIOUS CONTENT DETECTION WITH RETROSPECTIVE REPORTING

CROSS-REFERENCE TO RELATED APPLICATIONS

This application in a continuation of U.S. application Ser. No. 15/659,953, filed Jul. 26, 2017, the entire contents of which are incorporated herein by reference.

TECHNICAL FIELD

The present disclosure relates to detection of malicious content.

BACKGROUND

Malware is a cost to computer and network users in all types of environments. A user (client) may rely on a security server or appliance to provide protection against malicious content or attacks. It remains a challenge to correctly and effectively detect malicious software. On occasion, a file that was previously identified by a security server as clean (or of unknown status) may subsequently be discovered to be malicious. Conversely, a file that was previously identified as malicious may subsequently be discovered to be clean. The effects of a misidentified file typically need to be rectified on an end user device, by way of a notification of the state transition from the security server. However, a security server may be overwhelmed with tasks, resulting in a long wait time for a user to receive a response from the security server regarding the status of a file.

DESCRIPTION OF EXAMPLE EMBODIMENTS

Overview

In one embodiment, a method for detecting undesired data in a network is provided. A server obtains security intelligence data used for classifying whether data associated with a user activity in a network at a first time is undesirable. The server uses the security intelligence data to classify/determine whether first data in the network is undesirable. The server sends a first classifying result of the first data to a device associated with the first data. The server receives a request for classifying whether second data is undesirable based on the security intelligence data, and determines whether the server is overloaded with tasks at the time that the request to classify the second data is received. If the server is determined to be overloaded with tasks, the second data is logged in a repository and tagged to re-visit classification of the second data. The server sends to a device associated with the second data a notification indicating the second data is classified as unknown. When the server is no longer overloaded, it classifies whether the second data is undesirable to produce a second classifying result and re-classifies whether the first data is undesirable based on updated security intelligence data obtained by the server. The server then sends a second classifying result of the second data to the device associated with the second data. If disposition of the first data is changed based on the re-classifying, the server sends an updated first classifying result of the first data to the device associated with the first data.

Example Embodiments

Figure 1:
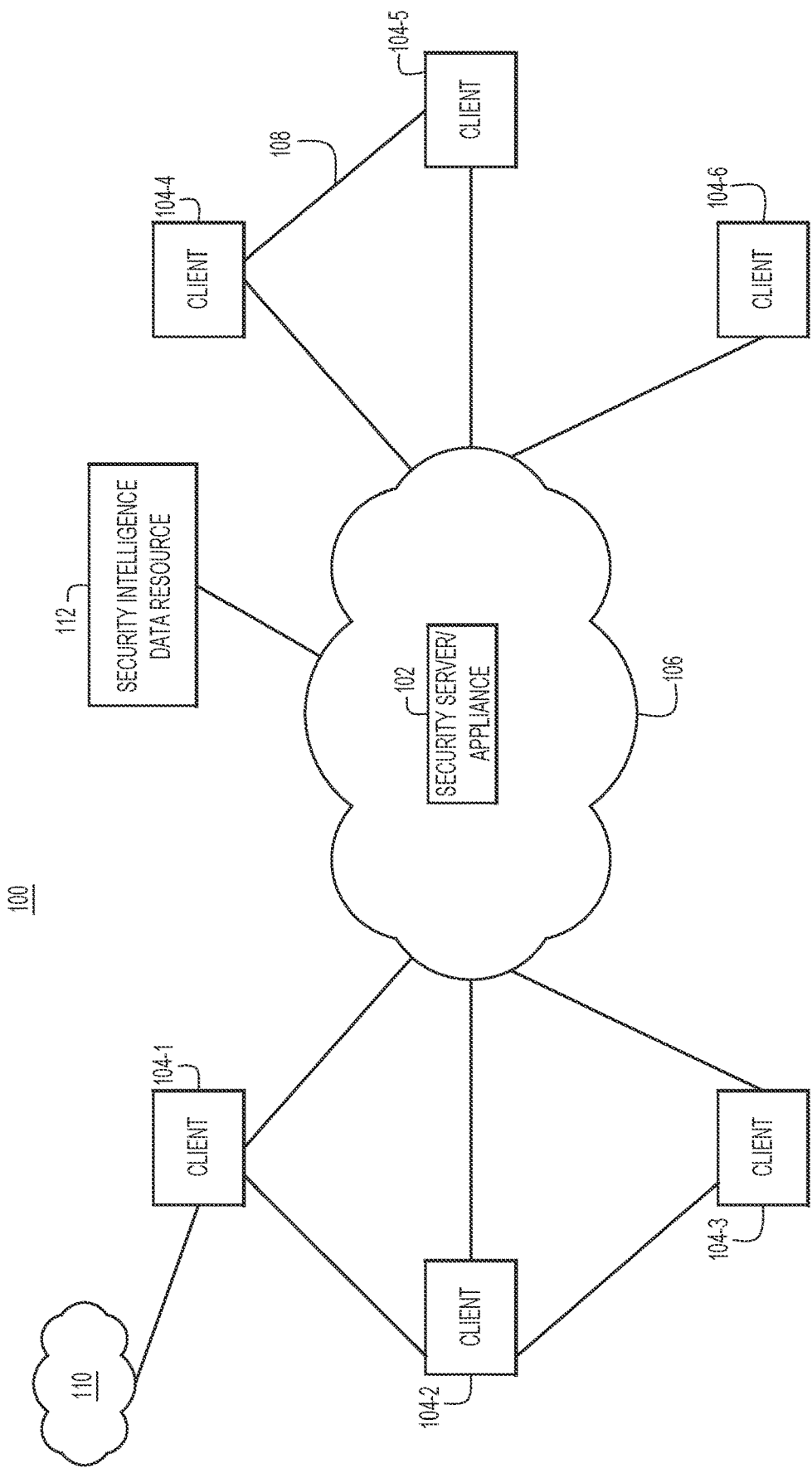
FIG. 1 depicts a network environment that hosts one or more security servers which provide network security services to one or more clients in a network, according to an example embodiment.

Reference is first made to FIG. 1. FIG. 1 depicts a network environment 100 that includes one or more security servers or appliances 102 which provide security services to one or more clients, according to an example embodiment. As an example, there are 6 clients shown in FIG. 1, denoted clients 104-1 through 104-6. Although one security server 102 is shown in FIG. 1, it is to be understood that more than one security server 102 may be deployed in the network environment 100. The security server 102 is located in network 106 and accessible to the one or more clients 104-1 through 104-6 via the network 106. The network 106 may be, for example, a local area network (LAN), which may be an enterprise network or home network or a wide area network (WAN) such as the Internet. The security server 102 may also be deployed independently of the cloud (i.e., off-cloud, such as on-premises) or in the cloud (in the network 106).

In addition to connection to the network 106, the clients 104 may be coupled to each other via direct or indirect links 108. Further, one or more of the clients 104 may be connected to other networks, such as network 110. Generally, a client includes any electronic device (desktop computer, laptop computer, tablet, SmartPhone, IoT device) or software/application program or module running on a physical electronic device that is capable of being used to access network 106.

The network environment 100 further includes one or more security intelligence data resources 112, from which the security server 102 can obtain security intelligence data for classifying/determining whether data associated with user activities in a network is undesirable. As used in this disclosure, data may include a file or a network packet or a plurality of network packets. In some embodiments, data can include metadata of a file or a network packet or packets. A data may be benign, but is deemed undesirable, such as downloading the latest software update that a network administrator does not wish to permit, or downloading and installing software that violates certain network policies. Further examples of undesirable data may include data related to malware, such as network data related to: an IP address check, a destination with low popularity, "TOR" (anonymous web-browsing) usage, use of a Domain-name Generating Algorithm (DGA), a connection check, use of online storage services (e.g., Dropbox™), and so on.

In some embodiments, the security intelligence data resource 112 may be a network server or storage that hosts anti-virus data or intrusion detection intelligence or other predetermined rules for detecting undesirable data. In one embodiment, the security intelligence data resource 112 may be integrated with the security server 102 in the network 106. The security intelligence data resource 112 may update its knowledge base about new threats or changes to existing threats.

Figure 2:
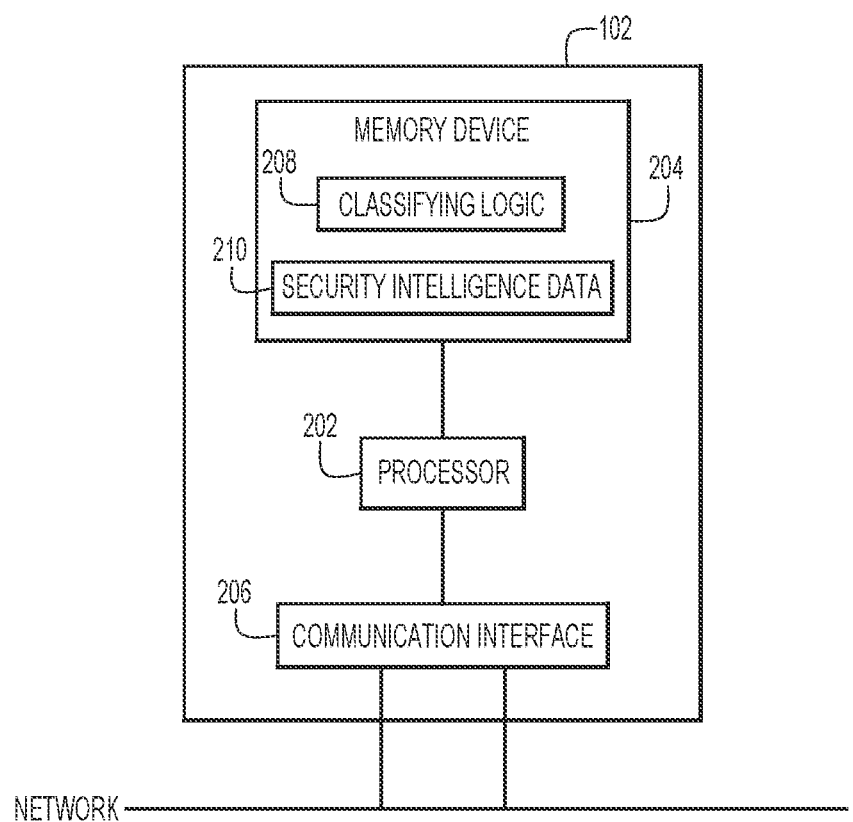
FIG. 2 depicts a block diagram of a server configured to provide security services to clients in a network, according to an example embodiment.

FIG. 2 is a block diagram depicting a security server or appliance 102 according to an example embodiment. Reference is also made to FIG. 1 for purposes of the description of FIG. 2. The security server 102 includes a processor 202, a memory 204, and a communication interface 206. The processor 202 may be a microprocessor or microcontroller (or multiple instances of such components) that is configured to execute program logic instructions (i.e., software) for carrying out various operations and tasks described herein. For example, the processor 202 is configured to execute instructions stored in the memory 204 for classifying logic 208 to classify whether data is undesirable against security intelligence data, or to determine whether it has been overloaded with tasks and consequently is not able to respond to a given request from a client about data to be checked for undesirable character. The determination of whether the security server 102 is overloaded is based on whether, at a given instant in time, the security server 102 has sufficient network bandwidth, sufficient computing power, or access to the security intelligence data, in order to properly analyze and respond to a request. Further descriptions of the operations performed by the processor 202 when executing instructions stored in the memory 204 are provided below.

The memory 204 may include read only memory (ROM), random access memory (RAM), magnetic disk storage media devices, optical storage media devices, flash memory devices, electrical, optical or other physical/tangible memory storage devices.

The functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the memory 204 stores data, such as security intelligence data 210 obtained from security intelligence data resources 112, used for the operations described herein and stores software or processor executable instructions that are executed to carry out the operations described herein.

The classifying logic 208 may take any of a variety of forms, so as to be encoded in one or more tangible/non-transitory computer readable memory media or storage device for execution, such as fixed logic or programmable logic (e.g., software/computer instructions executed by a processor), and the processor 202 may be an application-specific integrated circuit (ASIC) that comprises fixed digital logic, or a combination thereof.

For example, the processor 202 may be embodied by digital logic gates in a fixed or programmable digital logic integrated circuit, which digital logic gates are configured to perform the classifying logic 208. In general, the classifying logic 208 may be embodied in one or more computer-readable storage media encoded with software comprising computer executable instructions and when the software is executed operable to perform the operations described herein.

The communication interface 206 is configured to enable network communications and transmit signals to and receive signals from a network for the security server 102. In one example, the communication interface 206 may take the form of one or more network interface cards or circuits. For example, the communication interface 206 may receive requests from one or more clients for determining whether a data is undesirable. Further, the communication interface 206 may transmit one or more classifying results/responses to the clients.

The security server 102 may request security intelligence data 210 from the security intelligence data resource 112. For example, the security server 102 may periodically send a request to the security intelligence data resource 112 for updated security intelligence data 210. In some embodiments, the security intelligence data resource 112 may automatically push security intelligence data to the security server 102 periodically or whenever the security intelligence data is updated. Other methods now known or hereafter developed may be employed for the security server 102 to obtain security intelligence data 210 from the security intelligence data resource 112. The security server 102 stores the security intelligence data in its memory 204 for future use. In some embodiments, updated security intelligence data may overwrite existing security intelligence data 210 to save the storage space of the memory 204.

The security server 102 may autonomously or on-demand classify data associated with activity of a client. For example, the security server 102 receives a request from a client to classify whether a data associated with the client is undesirable. In response to the request, the security server 102 classifies the data against its security intelligence data, i.e., an act of "lookup," and in classifying, the security server 102 determines whether the data is benign, malicious, or unknown based on the security intelligence data 210. An unknown status may be indicated when the security intelligence data 210 does not have sufficient information to ascertain whether the data is benign or malicious. In some embodiments, data may be routed through the security server 102 on the way to a client. When the routing arrangement is so structured, the security server 102 may be configured to automatically classify the data against its security intelligence data, without being specifically queried by the client to do so. Thereafter, the security server 102 sends a classifying result to the client.

In some embodiments, the security server 102 may receive another request, from either the same client or a different client, for classifying whether a second data is undesirable based on the security intelligence data. However, there may be excessive load on the security server 102 at the time it receives the request. Thus, in some embodiments, the security server 102 determines whether it is overloaded with tasks at the time it receives a request to evaluate data as to whether or not the data is undesirable. If the security server 102 is not overloaded at the time the request is received, the security server 102 classifies whether the second data is undesirable based on the current security intelligence data and sends a classifying result of the second data to the client associated with the second data.

If it is determined that the security server 102 is overloaded at the time the request is received, the security server may invoke an "off-line" mode. Instead of performing lookups or other analysis against its security intelligence data 210 to determine if a particular data is malicious, clean, or of an unknown status, the security server 102 enters the "off-line" mode to determine the status of the particular data. In the "off-line" mode, the security server 102 can log the second data in a repository, such as memory 204, tag the second data to re-visit classification of the second data, and send to the client associated with the second data a notification indicating the second data is classified as unknown.

At a point later in time, when the security server 102 is no longer overloaded, the security server 102 classifies whether the second data is undesirable to produce a second classifying result and also re-classifies whether any previously-classified data is undesirable based on updated security intelligence data obtained by the security server 102 at a later time. Thereafter, the security server 102 sends a classifying result for the second data to the client associated with the second data. Moreover, if disposition of any previously-classified data is changed based on the re-classifying, the security server 102 sends an updated classifying result of the previously-classified data to the one or more clients associated with the previously-classified data. For example, if data was previously classified as benign and is re-classified as malicious based on updated security intelligence data, the client associated that data can be updated by the security server 102 sending a re-classifying result to that client. This allows the client associated with the data to take action based on the re-classifying result. For example, the client may move to block or quarantine the data. If re-classifying of the previously-classified data indicates that the disposition of that data has not been changed, the security server 102 sends a notification to the client associated with that data to allow the client to have confidence to continue using the data.

According to the techniques disclosed herein, while the security server 102 classifies the second data when it is not overloaded, it can also re-classify previously-classified data in the same lookup process based on updated security intelligence data such that data can be checked against the latest security intelligence data and any mis-classification based on the old security intelligence data can be corrected. These techniques improve data integrity in the network system. Moreover, when the security server 102 classifies a data as undesirable, e.g., malicious, the security server 102 can move to quarantine the data such that the undesirable data would not be accessed by any subscribing clients.

Figure 3:
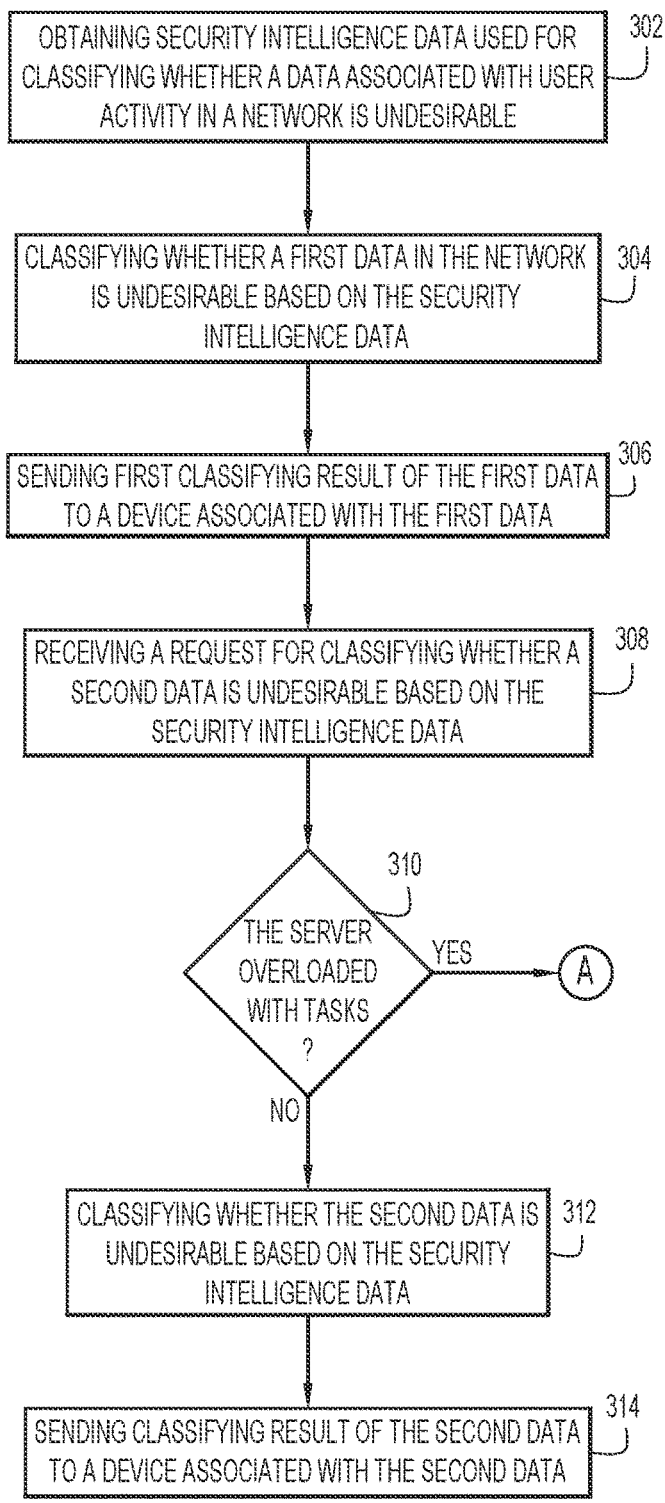
FIG. 3 is a flow chart of a method for classifying data in a network, according to an example embodiment.

Reference is now be made to FIG. 3. FIG. 3 is a flow chart illustrating a method 300 for classifying data in a network, according to an example embodiment. At 302, at a first time, a server obtains security intelligence data used for classifying whether data associated with user activity in a network is undesirable. At 304, the server classifies whether a first data in the network is undesirable based on the security intelligence data. At 306, the server sends a first classifying result of the first data to a device associated with the first data. The classifying result of the first data indicates that the first data is desirable or undesirable based on security rules in the security intelligence data. In some embodiments, the classifying result of the first data indicates that the first data is benign, malicious, or of an unknown status.

At 308, the server receives a request for classifying whether a second data is undesirable based on the security intelligence data. At 310, the server determines whether it is overloaded with tasks at the time the request for the second data is received. For example, the server may make its determination whether it is overloaded based on whether the server has sufficient network bandwidth, sufficient computing power, access to the security intelligence data, etc. If it is determined that the server is not overloaded, at 312, the server classifies whether the second data is undesirable based on the security intelligence data. At 314, the server sends a classifying result of the second data to a device associated with the second data. The device associated with the second data may be the same as or different from the device associated with the first data. As shown in FIG. 1, a server can provide services to any number of client devices. In one embodiment, the first and second data include a file or a network packet. In other embodiment, the first and second data include metadata of a file or a network packet.

Figure 4:
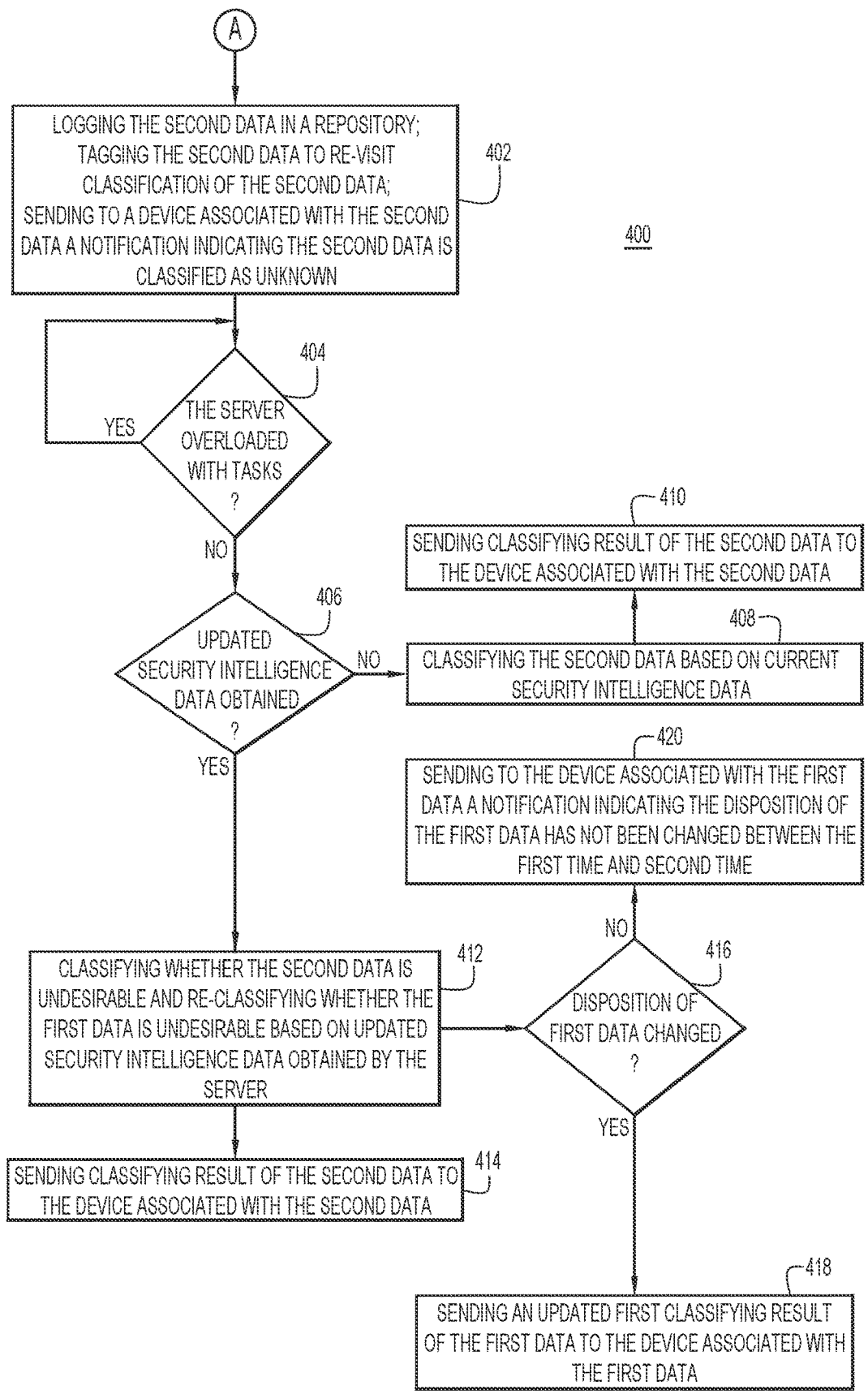
FIG. 4 is a flow chart of a method for handling a client request for classifying data when a server is overloaded, according to an example embodiment.

If at 310 the server determines that it is overloaded, the process continues to the operations depicted in FIG. 4.

Reference is now made to FIG. 4. FIG. 4 is a flow chart illustrating a method 400 for handling a client request for classifying data when a server is overloaded, according to an example embodiment. At 402, when the server is overloaded, the server logs the second data in a repository, tags the second data to re-visit classification of the second data, and sends to a device associated with the second data a notification indicating the second data is classified as unknown. The notification may serve as a warning to the device associated with the second data that the status of the second data is undecided and any use of the second data should proceed with certain level of caution. At 404, at a later time, while the server continues to provide services to clients, it checks if it is still overloaded with tasks. This step can be performed periodically to optimize the performance of the server.

If it is determined that the server is still overloaded (Yes at 404), the server continues to delay classifying the second data and waits for another workload determination. If it is determined that the server is no longer overloaded (No at 404), at 406 the server determines whether it has obtained updated security intelligence data. If the server has not obtained updated security intelligence data (No at 406), at 408 the server classifies the second data based on the current security intelligence data, and at 410 sends a classifying result of the second data to the device associated with the second data.

If the server has obtained updated security intelligence data (Yes at 406), at 412 the server classifies/determines whether the second data is undesirable and re-classifies whether the first data is undesirable based on the updated security intelligence data. At 414, the server sends a classifying result of the second data to the device associated with the second data. At 416, the server determines whether disposition of the first data has been changed after the re-classifying. For example, the first data may be classified as benign and re-classified as malicious based on the updated security intelligence data. Or, the first data may be classified as malicious and re-classified as benign based on the updated security intelligence data. In still another alternative, the first data may be classified as unknown and re-classified as benign or malicious. If the disposition of the first data has been changed (Yes at 416), at 418 the server sends an updated first classifying result of the first data to the device associated with the first data. If the disposition of the first data has not been changed (No at 416), the method 400 stops or, optionally, at 420 the server sends to the device associated with the first data a notification indicating the disposition of the first data has not changed between a first time when the security intelligence data was obtained and a second time when the updated security intelligence data was obtained.

Figure 5:
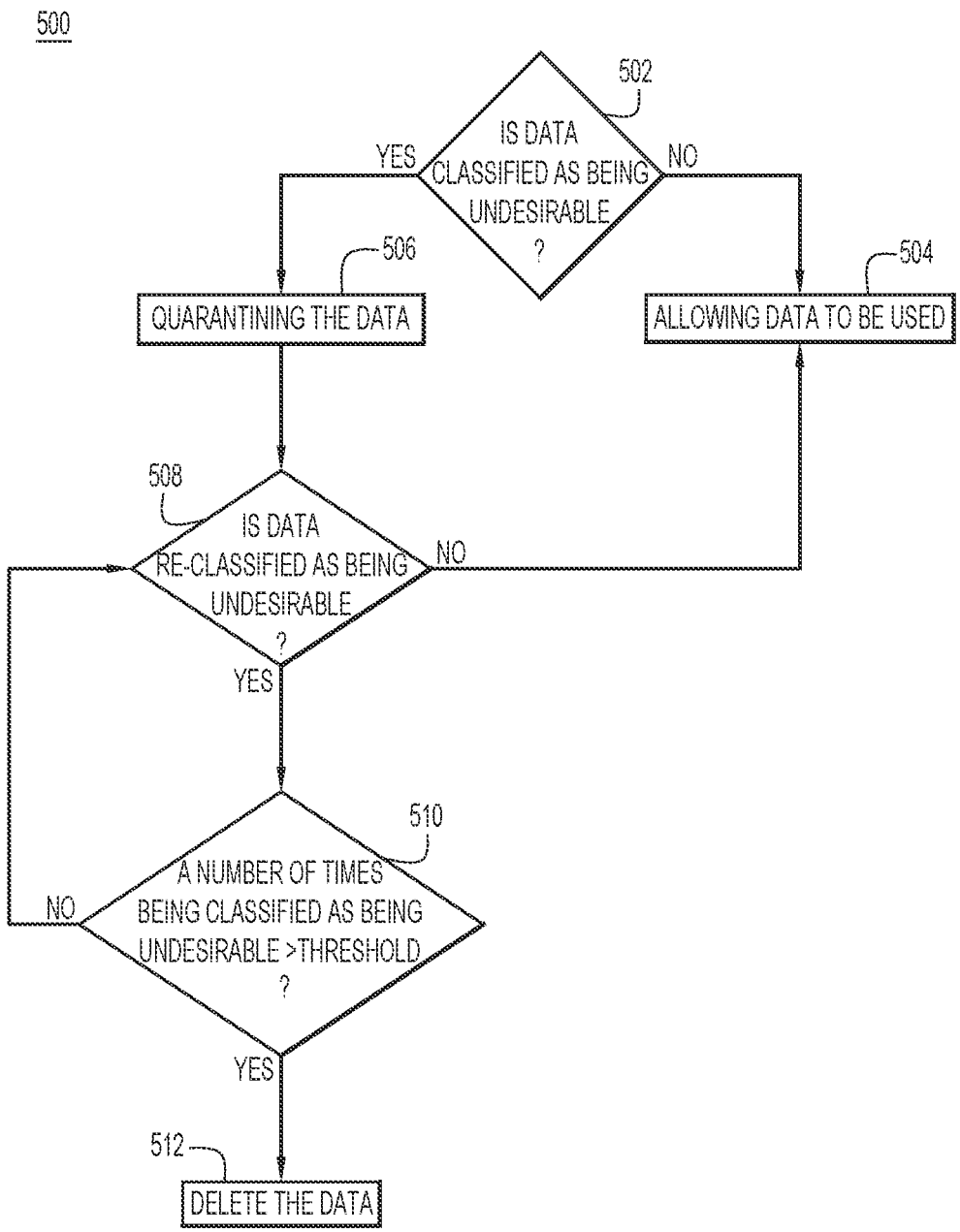
FIG. 5 is a flow chart of a method performed by a server in response to classification of a data, according to an example embodiment.

Reference will now be made to FIG. 5. FIG. 5 is a flow chart illustrating a method 500 performed by a server in response to classification of a data, according to an example embodiment. At 502, the server determines whether a data is classified as being undesirable based on security intelligence data. If the data is determined to be desirable (No at 502), at 504 the server allows the data to be used. For example, the server may allow the client(s) associated with data to access the data or forward the data to the associated client(s). If the data is determined to be undesirable (Yes at 502), e.g., malicious, the server may quarantine the data. For example, the server may deny any further access from the client(s) to the data, or move the data to a quarantine storage not accessible by any client. At 508, the server determines if the data has been re-classified as being undesirable based on updated security intelligence data. If the disposition of the data has been changed to being desirable (No at 508), at 504 the server allows the data to be used. If the data is still classified as being undesirable after re-classification (Yes at 508), at 510 the server determines whether a number of times the data being classified as being undesirable is greater than a threshold. If so (Yes at 510), at 512 the server deletes data. If the number of times the data being classified as being undesirable is not greater than the threshold, the server waits for another round of re-classifying the data and returns to 508.

The techniques disclosed herein provide performance optimization and a way of dealing with excessive load on a security server or appliance when the server is requested to classify a data. Example methods involve performing a determination as to whether a data is undesirable asynchronously or at a separate, or later, time. The determination, using the retrospective feature of reporting a re-classifying result to a client associated with the data, may be performed transparently with respect to a client. The client has no idea that the server was unable to serve the request at the time it was sent to the server. The client simply receives a response from the server and operates accordingly, and the client may later receive an updated response from the server, and operate accordingly.

Further, when there is excessive load on a server, performance associated with determining/classifying whether a data is undesirable may be degraded. Typically, when there is excessive load on a server, there may be a significant wait time before the server is able to provide a client with an answer about the status of a particular data. According to the techniques disclosed herein, the server can stop performing immediate real-time lookup/analysis to determine the status of the particular data and inform the client that the status of the particular data is unknown, to avoid dropping event telemetry. The server may respond with an indeterminate answer (e.g., unknown) in order to leverage notification of a possible state switch at a later time when a determination can be made.

To summarize, when a client asks for a determination at time t1 as to whether a particular data is clean or malicious, the client may receive an answer. If it is subsequently discovered at time t2 that the answer given at time t1 is incorrect (e.g., if a data was unknown at t1, but later determined to be malicious, or a data previously identified as malicious is clean after re-classification), the techniques disclosed herein include a retrospective feature that allows a client to be informed of the actual disposition of the particular data at time t2, e.g., receiving a state/disposition transition change notification.

Thus, if processing load of a server at time t1 made it difficult to respond to the client in a certain period of time, the server would respond with a disposition of unknown, allowing the event to be processed and cataloged successfully, and allowing a retrospective notification system to inform the client at time t2 if the file was in fact malicious, avoiding an otherwise problematic error condition.

When a server is overloaded, e.g., does not have sufficient bandwidth or other resources (access to timely information from security intelligence data) to provide a client with information relating to whether a data is benign or malicious, the server may operate in an "off-line" mode, using a retrospective feature to determine the status of the data asynchronously when necessary.

According to the techniques disclosed herein, the performance of a network system may be optimized when an excessively loaded server is able to provide a client with information relating to the status of a data by performing a lookup asynchronously.

In summary, in one aspect, a method for detecting undesired data is provided. The method includes: at a server, obtaining security intelligence data used for classifying whether data associated with user activity in a network is undesirable at a first time; classifying whether a first data in the network is undesirable based on the security intelligence data; sending a first classifying result of the first data to a device associated with the first data; receiving a request for classifying whether a second data is undesirable based on the security intelligence data; determining whether the server is overloaded with tasks at a time when the request for classifying the second data is received; if the server is determined to be overloaded with tasks, logging the second data in a repository, tagging the second data to re-visit classification of the second data, and sending to a device associated with the second data a notification indicating the second data is classified as unknown; when the server is no longer overloaded, classifying whether the second data is undesirable to produce a second classifying result and re-classifying whether the first data is undesirable based on updated security intelligence data; sending a second classifying result of the second data to the device associated with the second data; and if disposition of the first data is changed based on the re-classifying, sending an updated first classifying result of the first data to the device associated with the first data.

In another aspect, an apparatus is provided. The apparatus includes a network interface that enables network communications, a processor, and a memory to store data and instructions executable by the processor. The processor is configured to execute the instructions to: obtain security intelligence data used for classifying whether data associated with user activity in a network is undesirable at a first time; classify whether a first data in the network is undesirable based on the security intelligence data; send a first classifying result of the first data to a device associated with the first data; receive a request for classifying whether a second data is undesirable based on the security intelligence data; and determine whether the apparatus is overloaded with tasks when the request for classifying the second data is received. If the apparatus is determined to be overloaded with tasks, the processor is configured to execute the instructions to log the second data in a repository, tag the second data to re-visit classification of the second data, and send to a device associated with the second data a notification indicating the second data is classified as unknown. The processor is further configured to execute the instructions to: when the apparatus is no longer overloaded, classify whether the second data is undesirable to produce a second classifying result and re-classify whether the first data is undesirable based on updated security intelligence data; send a second classifying result of the second data to the device associated with the second data; and if disposition of the first data is changed based on the re-classifying, send an updated first classifying result of the first data to the device associated with the first data.

In yet another aspect, a non-transitory computer-readable storage media encoded with software comprising computer executable instructions which, when executed by a processor, cause the processor to: obtain security intelligence data used for classifying whether data associated with user activity in a network is undesirable at a first time; classify whether a first data in the network is undesirable based on the security intelligence data; send a first classifying result of the first data to a device associated with the first data; receive a request for classifying whether a second data is undesirable based on the security intelligence data; determine whether the processor is overloaded with tasks when the request for classifying the second data is received; if the processor is determined to be overloaded with tasks, log the second data in a repository, tag the second data to re-visit classification of the second data, and send to a device associated with the second data a notification indicating the second data is classified as unknown; when the processor is no longer overloaded, classify whether the second data is undesirable to produce a second classifying result and re-classify whether the first data is undesirable based on updated security intelligence data; send a second classifying result of the second data to the device associated with the second data; and if disposition of the first data is changed based on the re-classifying, send an updated first classifying result of the first data to the device associated with the first data.

The above description is intended by way of example only. Various modifications and structural changes may be made therein without departing from the scope of the concepts described herein and within the scope and range of equivalents of the claims.

What is claimed is:

1. A method comprising:
   at a server for classifying whether data associated with user activity in a network is undesirable, determining that the server is overloaded at a first time;
   responsive to a determination that the server is overloaded at the first time, delaying classifying whether a first data in the network is undesirable based on security intelligence data;
   providing a first classifying result of the first data to a device associated with the first data, the first classifying result indicating an unknown status of the first data;
   at a second time subsequent to the first time, obtaining updated security intelligence data for classifying whether data in the network is undesirable;
   responsive to a determination that the server is no longer overloaded, classifying whether the first data is undesirable based on the updated security intelligence data to update the first classifying result; and
   responsive to a determination that the first classifying result of the first data is changed based on classifying, providing an updated first classifying result of the first data to the device associated with the first data.

2. The method of claim 1, further comprising:
   responsive to a determination that the first classifying result of the first data is not changed in classifying, providing to the device associated with the first data a notification indicating the first classifying result of the first data has not changed between the first time and the second time.

3. The method of claim 1, wherein the first data includes a file, a network packet, or metadata of the file or the network packet.

4. The method of claim 1, further comprising:
   in response to classifying of the first data as being undesirable, quarantining the first data.

5. The method of claim 1, wherein the security intelligence data and the updated security intelligence data includes information for classifying data as benign, malicious, or unknown.

6. The method of claim 1, wherein determining whether the server is overloaded is based on whether the server has one or more of: sufficient network bandwidth, sufficient computing power, or access to the security intelligence data.

7. The method of claim 1, wherein delaying classifying whether the first data in the network is undesirable comprises:
   logging the first data into a repository; and
   tagging the first data to re-visit classification.

8. An apparatus comprising:
   a network interface that enables network communications over a network;
   a memory configured to store security intelligence data used for classifying whether data associated with user activity in the network is undesirable; and
   a hardware processor configured to:
      determine that the apparatus is overloaded with tasks at a first time;
      responsive to a determination that the apparatus is overloaded at the first time, delay classifying whether a first data in the network is undesirable based on the security intelligence data;
      provide via the network interface, a first classifying result of the first data to a device associated with the first data, the first classifying result indicating an unknown status of the first data;
      at a second time subsequent to the first time, obtain updated security intelligence data for classifying whether data in the network is undesirable;
      responsive to a determination that the apparatus is no longer overloaded, classify whether the first data is undesirable based on the updated security intelligence data to update the first classifying result; and
      responsive to a determination that the first classifying result of the first data is changed based on classifying, provide via the network interface, an updated first classifying result of the first data to the device associated with the first data.

9. The apparatus of claim 8, wherein the processor is further configured to:
   responsive to a determination that the first classifying result of the first data is not changed in classifying, provide via the network interface to the device associated with the first data, a notification indicating the first classifying result of the first data has not changed between the first time and the second time.

10. The apparatus of claim 8, wherein the first data includes a file, a network packet, or metadata of the file or the network packet.

11. The apparatus of claim 8, wherein the processor is further configured to:
    in response to classifying of the first data as being undesirable, quarantine the first data.

12. The apparatus of claim 8, wherein the security intelligence data and the updated security intelligence data includes information for classifying data as benign, malicious, or unknown.

13. The apparatus of claim 8, wherein the processor is further configured to determine whether the apparatus is overloaded based on whether the apparatus has one or more of: sufficient network bandwidth, sufficient computing power, or access to the security intelligence data.

14. The apparatus of claim 8, wherein the processor is configured to delay classifying whether the first data in the network is undesirable by:
    logging the first data into a repository; and
    tagging the first data to re-visit classification.

15. A non-transitory computer-readable storage media encoded with software comprising computer executable instructions which, when executed by a processor of a server for classifying whether data associated with user activity in a network is undesirable, cause the processor to:
- determine that the server is overloaded at a first time;
- responsive to a determination that the server is overloaded at the first time, delay classifying whether a first data in the network is undesirable based on security intelligence data;
- provide a first classifying result of the first data to a device associated with the first data, the first classifying result indicating an unknown status of the first data;
- at a second time subsequent to the first time, obtain updated security intelligence data for classifying whether data in the network is undesirable;
- responsive to a determination that the server is no longer overloaded, classify whether the first data is undesirable based on the updated security intelligence data to update the first classifying result; and
- responsive to a determination that the first classifying result of the first data is changed based on classifying, provide an updated first classifying result of the first data to the device associated with the first data.

16. The non-transitory computer-readable storage media of claim 15, wherein the computer executable instructions cause the processor to:
- responsive to a determination that the first classifying result of the first data is not changed in classifying, provide to the device associated with the first data, a notification indicating the first classifying result of the first data has not changed between the first time and the second time.

17. The non-transitory computer-readable storage media of claim 15, wherein the computer executable instructions cause the processor to:
- in response to classifying of the first data as being undesirable, quarantine the first data.

18. The non-transitory computer-readable storage media of claim 15, wherein the security intelligence data and the updated security intelligence data includes information for classifying data as benign, malicious, or unknown.

19. The non-transitory computer-readable storage media of claim 15, wherein the computer executable instructions cause the processor to determine whether the processor is overloaded based on whether the processor has one or more of: sufficient network bandwidth, sufficient computing power, or access to the security intelligence data.

20. The non-transitory computer-readable storage media of claim 15, wherein the computer executable instructions cause the processor to delay classifying whether the first data in the network is undesirable by causing the processor to:
- log the first data into a repository; and
- tag the first data to re-visit classification.

* * * * *